US012348981B2

(12) United States Patent
Kim et al.

(10) Patent No.: US 12,348,981 B2
(45) Date of Patent: Jul. 1, 2025

(54) REPURPOSING CONSUMER ELECTRONIC DEVICES AS NODES IN WIRELESS MESH NETWORKS

(71) Applicant: NETGEAR, Inc., San Jose, CA (US)

(72) Inventors: Tae Ho Kim, Richmond (CA); Hai Duy Nguyen, Richmond (CA); Joseph Amalan Arul Emmanuel, San Jose, CA (US)

(73) Assignee: NETGEAR, INC., San Jose, CA (US)

( * ) Notice: Subject to any disclaimer, the term of this patent is extended or adjusted under 35 U.S.C. 154(b) by 363 days.

(21) Appl. No.: 17/690,299

(22) Filed: Mar. 9, 2022

(65) Prior Publication Data

US 2023/0292141 A1    Sep. 14, 2023

(51) Int. Cl.
| | |
|---|---|
| *H04W 16/20* | (2009.01) |
| *H04W 40/04* | (2009.01) |
| *H04W 40/20* | (2009.01) |
| *H04W 76/15* | (2018.01) |
| *H04W 88/04* | (2009.01) |

(52) U.S. Cl.
CPC ........... *H04W 16/20* (2013.01); *H04W 40/04* (2013.01); *H04W 40/20* (2013.01); *H04W 76/15* (2018.02); *H04W 88/04* (2013.01)

(58) Field of Classification Search
CPC ..... H04W 16/20; H04W 40/04; H04W 40/20; H04W 76/15; H04W 84/18; H04W 88/04; H04W 76/10; H04W 76/11; H04W 76/12; H04W 76/14; H04W 76/16; H04W 76/18; H04W 76/19
See application file for complete search history.

(56) References Cited

U.S. PATENT DOCUMENTS

| | | | | |
|---|---|---|---|---|
| 7,835,301 | B1 * | 11/2010 | Maufer ................ | H04W 24/02 370/254 |
| 8,094,637 | B1 * | 1/2012 | Goel ................... | H04W 40/246 370/254 |
| 8,595,348 | B2 * | 11/2013 | Bill ........................ | H04L 41/22 709/224 |
| 8,780,763 | B2 * | 7/2014 | Veillette ................ | G01D 4/004 370/255 |
| 8,805,831 | B2 * | 8/2014 | Svendsen ............... | G11B 27/11 348/231.3 |
| 9,055,105 | B2 * | 6/2015 | Leppanen ............. | H04W 4/023 |
| 9,060,322 | B2 * | 6/2015 | Zou ........................ | H04L 45/18 |
| 9,648,548 | B1 * | 5/2017 | Gan ....................... | H04L 67/12 |
| 9,699,831 | B2 * | 7/2017 | Choi ..................... | H04W 88/04 |
| 10,089,094 | B2 * | 10/2018 | Wang ................... | H04L 61/5007 |
| 10,104,597 | B2 * | 10/2018 | Ge ........................ | H04W 48/02 |
| 10,216,857 | B2 * | 2/2019 | Perret ................... | G06Q 30/00 |
| 10,341,007 | B2 * | 7/2019 | Song ................... | H04B 7/15521 |
| 10,482,250 | B1 * | 11/2019 | Joshi ...................... | G06F 21/55 |
| 10,588,069 | B1 * | 3/2020 | Chen .................... | H04L 45/26 |
| 10,887,166 | B2 * | 1/2021 | Van Der Geer ...... | H04W 40/20 |
| 10,905,326 | B1 * | 2/2021 | Lodato ................... | H04Q 9/00 |
| 10,939,498 | B2 * | 3/2021 | Sohn .................... | H05B 44/00 |

(Continued)

*Primary Examiner* — Dung B Huynh
(74) *Attorney, Agent, or Firm* — Perkins Coie LLP

(57) ABSTRACT

Introduced here are approaches to improving the coverage of mesh networks that involve repurposing consumer electronic devices as nodes. By repurposing consumer electronic devices that are configured for a Wi-Fi wireless network protocol, the "dead spot" issue that plagues traditional wireless networks can be addressed at minimal cost.

12 Claims, 8 Drawing Sheets

(56) References Cited

U.S. PATENT DOCUMENTS

| | | | | |
|---|---|---|---|---|
| 11,102,642 B1* | 8/2021 | Lembke | | H04W 8/24 |
| 11,119,836 B2* | 9/2021 | Breaux | | H04W 76/14 |
| 11,129,030 B1* | 9/2021 | Rao | | H04W 16/14 |
| 11,129,237 B1* | 9/2021 | Neber | | G05B 15/02 |
| 11,197,224 B1* | 12/2021 | Baker | | H04W 28/021 |
| 11,240,746 B1* | 2/2022 | Wong | | H04W 48/20 |
| 11,337,275 B2* | 5/2022 | Bae | | H04W 24/10 |
| 11,363,519 B2* | 6/2022 | Qi | | H04W 24/04 |
| 11,412,492 B2* | 8/2022 | Chae | | H04W 72/20 |
| 11,877,231 B2* | 1/2024 | Jayawardene | | H04W 84/20 |
| 11,924,738 B1* | 3/2024 | Choi | | H04W 76/11 |
| 2004/0009775 A1* | 1/2004 | Kang | | H04W 12/033 |
| | | | | 455/449 |
| 2004/0166851 A1* | 8/2004 | Backes | | H04W 52/0216 |
| | | | | 455/434 |
| 2005/0079871 A1* | 4/2005 | Kirk | | H04W 8/245 |
| | | | | 455/446 |
| 2005/0143130 A1* | 6/2005 | Horneman | | H04W 88/08 |
| | | | | 455/552.1 |
| 2005/0165916 A1* | 7/2005 | Cromer | | H04W 76/15 |
| | | | | 709/220 |
| 2006/0146846 A1* | 7/2006 | Yarvis | | H04L 12/4604 |
| | | | | 370/406 |
| 2006/0155827 A1* | 7/2006 | Prehofer | | H04L 67/06 |
| | | | | 714/E11.135 |
| 2006/0215576 A1* | 9/2006 | Yu | | H04W 48/18 |
| | | | | 370/254 |
| 2007/0038743 A1* | 2/2007 | Hellhake | | H04L 61/5014 |
| | | | | 709/224 |
| 2007/0061476 A1* | 3/2007 | Demsey | | H04L 51/214 |
| | | | | 709/230 |
| 2007/0070959 A1* | 3/2007 | Almeroth | | H04L 67/12 |
| | | | | 370/338 |
| 2007/0109972 A1* | 5/2007 | MacDonald | | H04W 84/18 |
| | | | | 370/252 |
| 2007/0121559 A1* | 5/2007 | Xhafa | | H04W 40/246 |
| | | | | 370/408 |
| 2007/0245034 A1* | 10/2007 | Retana | | H04L 45/02 |
| | | | | 709/238 |
| 2007/0248067 A1* | 10/2007 | Banerjea | | H04L 45/26 |
| | | | | 370/338 |
| 2007/0259670 A1* | 11/2007 | Sakhpara | | H04W 24/00 |
| | | | | 455/452.2 |
| 2008/0026788 A1* | 1/2008 | Hamada | | H04W 88/06 |
| | | | | 455/552.1 |
| 2008/0031203 A1* | 2/2008 | Bill | | H04W 8/005 |
| | | | | 370/338 |
| 2008/0144587 A1* | 6/2008 | Gupta | | H04W 40/248 |
| | | | | 370/338 |
| 2008/0219185 A1* | 9/2008 | Zou | | H04L 45/02 |
| | | | | 370/254 |
| 2008/0240078 A1* | 10/2008 | Thubert | | H04W 40/08 |
| | | | | 370/406 |
| 2008/0316914 A1* | 12/2008 | Vercellone | | H04L 45/28 |
| | | | | 370/216 |
| 2009/0098824 A1* | 4/2009 | Rofougaran | | H04W 40/22 |
| | | | | 455/13.1 |
| 2009/0116411 A1* | 5/2009 | Castagnoli | | H04W 48/16 |
| | | | | 370/256 |
| 2009/0187654 A1* | 7/2009 | Raja | | H04L 67/02 |
| | | | | 709/224 |
| 2009/0248695 A1* | 10/2009 | Ozzie | | H04L 67/02 |
| 2009/0323659 A1* | 12/2009 | Zhang | | H04W 76/14 |
| | | | | 370/338 |
| 2010/0093340 A1* | 4/2010 | Buracchini | | H04W 76/14 |
| | | | | 455/456.1 |
| 2010/0177703 A1* | 7/2010 | daCosta | | H04W 8/005 |
| | | | | 370/328 |
| 2010/0232354 A1* | 9/2010 | Patil | | H04L 43/103 |
| | | | | 370/328 |
| 2010/0260146 A1* | 10/2010 | Lu | | H04L 12/4641 |
| | | | | 455/432.1 |
| 2011/0225312 A1* | 9/2011 | Liu | | H04L 65/752 |
| | | | | 709/231 |
| 2011/0244852 A1* | 10/2011 | Quadri | | H04W 24/04 |
| | | | | 455/423 |
| 2012/0033568 A1* | 2/2012 | Park | | H04W 76/14 |
| | | | | 370/252 |
| 2012/0159586 A1* | 6/2012 | Carney | | H04L 63/105 |
| | | | | 726/5 |
| 2012/0197988 A1* | 8/2012 | Leppanen | | G06Q 30/0251 |
| | | | | 709/204 |
| 2013/0021932 A1* | 1/2013 | Damnjanovic | | H04W 52/0209 |
| | | | | 370/252 |
| 2013/0053030 A1* | 2/2013 | Wakayama | | H04W 24/08 |
| | | | | 455/434 |
| 2013/0080618 A1* | 3/2013 | Balwani | | G16H 10/20 |
| | | | | 709/224 |
| 2013/0136033 A1* | 5/2013 | Patil | | H04W 84/18 |
| | | | | 370/254 |
| 2013/0163407 A1* | 6/2013 | Sinha | | H04L 45/22 |
| | | | | 370/217 |
| 2013/0171964 A1* | 7/2013 | Bhatia | | H04W 12/08 |
| | | | | 455/411 |
| 2013/0260690 A1* | 10/2013 | Cha | | H04B 7/26 |
| | | | | 455/41.2 |
| 2013/0279410 A1* | 10/2013 | Dublin, III | | H04L 45/127 |
| | | | | 370/328 |
| 2014/0010225 A1* | 1/2014 | Puregger | | H04W 12/08 |
| | | | | 370/338 |
| 2014/0025798 A1* | 1/2014 | Apte | | H04L 12/28 |
| | | | | 709/223 |
| 2014/0064181 A1* | 3/2014 | Srivastava | | H04L 45/26 |
| | | | | 370/328 |
| 2014/0064198 A1* | 3/2014 | Pan | | H04W 76/10 |
| | | | | 370/329 |
| 2014/0086121 A1* | 3/2014 | Emeott | | H04L 61/30 |
| | | | | 370/311 |
| 2014/0089523 A1* | 3/2014 | Roy | | H04L 61/4511 |
| | | | | 709/242 |
| 2014/0101654 A1* | 4/2014 | Chang | | H04L 67/34 |
| | | | | 717/174 |
| 2014/0106733 A1* | 4/2014 | Wei | | H04W 4/50 |
| | | | | 455/418 |
| 2014/0112242 A1* | 4/2014 | Vilmur | | H04B 7/2606 |
| | | | | 370/327 |
| 2014/0185582 A1* | 7/2014 | Kim | | H04W 36/0016 |
| | | | | 370/331 |
| 2014/0192705 A1* | 7/2014 | Ayadurai | | H04B 7/15507 |
| | | | | 370/315 |
| 2014/0192723 A1* | 7/2014 | Schenk | | H05B 47/19 |
| | | | | 370/328 |
| 2014/0269614 A1* | 9/2014 | Maguire | | H04W 36/03 |
| | | | | 370/331 |
| 2014/0321314 A1* | 10/2014 | Fodor | | G06Q 40/00 |
| | | | | 370/252 |
| 2014/0328257 A1* | 11/2014 | Kamlani | | H04W 76/10 |
| | | | | 370/329 |
| 2014/0355501 A1* | 12/2014 | Carmon | | H04W 52/0254 |
| | | | | 370/311 |
| 2015/0055506 A1* | 2/2015 | Birlik | | H04W 72/27 |
| | | | | 370/254 |
| 2015/0100197 A1* | 4/2015 | Peirce | | H04W 12/08 |
| | | | | 701/31.4 |
| 2015/0124641 A1* | 5/2015 | MacDonald | | H04W 88/00 |
| | | | | 370/254 |
| 2015/0138991 A1* | 5/2015 | Timariu | | H04W 52/0251 |
| | | | | 370/241 |
| 2015/0156063 A1* | 6/2015 | Maetz | | H04W 48/20 |
| | | | | 370/254 |
| 2015/0201444 A1* | 7/2015 | Kiukkonen | | H04W 4/50 |
| | | | | 455/450 |
| 2015/0215028 A1* | 7/2015 | Ljung | | H04W 4/06 |
| | | | | 370/315 |
| 2015/0237663 A1* | 8/2015 | Wilhelmsson | | H04W 52/281 |
| | | | | 455/450 |
| 2015/0271826 A1* | 9/2015 | Gunasekara | | H04L 45/02 |
| | | | | 370/329 |

(56) References Cited

U.S. PATENT DOCUMENTS

| | | | | |
|---|---|---|---|---|
| 2015/0365833 A1* | 12/2015 | Stafford | H04W 24/02 | 370/252 |
| 2016/0007387 A1* | 1/2016 | Adib | H04L 67/535 | 370/329 |
| 2016/0028675 A1* | 1/2016 | Veillette | H04L 51/214 | 370/312 |
| 2016/0073336 A1* | 3/2016 | Geller | H04W 48/20 | 455/434 |
| 2016/0080198 A1* | 3/2016 | Liu | H04L 41/082 | 370/338 |
| 2016/0088615 A1* | 3/2016 | Soyak | H04W 72/27 | 370/254 |
| 2016/0127989 A1* | 5/2016 | Zhang | H04W 52/0235 | 726/7 |
| 2016/0165387 A1* | 6/2016 | Nhu | H04W 4/80 | 455/41.1 |
| 2016/0191642 A1* | 6/2016 | Acar | H04L 67/563 | 455/41.2 |
| 2016/0219632 A1* | 7/2016 | Wallentin | H04W 76/14 | |
| 2016/0269277 A1* | 9/2016 | Floberg | H04L 49/1584 | |
| 2016/0373963 A1* | 12/2016 | Chechani | H04B 7/18504 | |
| 2017/0013524 A1* | 1/2017 | Ho | H04W 48/20 | |
| 2017/0048700 A1* | 2/2017 | Huang | H04W 12/0431 | |
| 2017/0048785 A1* | 2/2017 | Ge | H04W 48/02 | |
| 2017/0055156 A1* | 2/2017 | Myers | H04W 12/04 | |
| 2017/0070841 A1* | 3/2017 | Shalunov | H04W 4/80 | |
| 2017/0134954 A1* | 5/2017 | Speight | H04L 61/5014 | |
| 2017/0135145 A1* | 5/2017 | Amini | H04L 45/20 | |
| 2017/0141860 A1* | 5/2017 | Furuichi | H04W 52/245 | |
| 2017/0142616 A1* | 5/2017 | Hicks | H04W 28/20 | |
| 2017/0272121 A1* | 9/2017 | Dao | H04W 4/70 | |
| 2017/0279628 A1* | 9/2017 | Takahashi | H04L 12/403 | |
| 2017/0289824 A1* | 10/2017 | Figoli | H04W 24/02 | |
| 2017/0332439 A1* | 11/2017 | Savolainen | H04L 45/04 | |
| 2017/0339570 A1* | 11/2017 | Hui | H04B 17/391 | |
| 2017/0374602 A1* | 12/2017 | Gokturk | H04L 45/125 | |
| 2018/0054772 A1* | 2/2018 | Tan | H04W 40/12 | |
| 2018/0063714 A1* | 3/2018 | Stephenson | H04L 63/083 | |
| 2018/0063827 A1* | 3/2018 | Soysal | H04L 5/0037 | |
| 2018/0069664 A1* | 3/2018 | Khoryaev | H04L 1/1621 | |
| 2018/0089410 A1* | 3/2018 | Caso | G06F 21/606 | |
| 2018/0103505 A1* | 4/2018 | Amini | H04W 84/045 | |
| 2018/0109999 A1* | 4/2018 | Finnegan | H04N 7/185 | |
| 2018/0156211 A1* | 6/2018 | Bishop | F04B 49/08 | |
| 2018/0262588 A1* | 9/2018 | Lin | H04L 67/06 | |
| 2018/0288563 A1* | 10/2018 | Krzych | H04W 4/021 | |
| 2018/0295028 A1* | 10/2018 | Bao | H04L 41/0889 | |
| 2018/0310241 A1* | 10/2018 | Yu | H04W 4/44 | |
| 2018/0316446 A1* | 11/2018 | Nie | H04B 17/382 | |
| 2018/0343200 A1* | 11/2018 | Jana | H04L 45/70 | |
| 2018/0359809 A1* | 12/2018 | Sohn | H05B 47/19 | |
| 2019/0020730 A1* | 1/2019 | Singamsetty | H04W 4/50 | |
| 2019/0029068 A1* | 1/2019 | Sturek | H04L 61/50 | |
| 2019/0045558 A1* | 2/2019 | Zhang | H04L 61/5092 | |
| 2019/0052347 A1* | 2/2019 | Otake | H04W 76/15 | |
| 2019/0104056 A1* | 4/2019 | Poorrezaei | H04W 40/10 | |
| 2019/0104422 A1* | 4/2019 | Chiang | H04W 48/08 | |
| 2019/0124401 A1* | 4/2019 | Lentner | H04N 21/2223 | |
| 2019/0132769 A1* | 5/2019 | Kothari | H04B 7/026 | |
| 2019/0141165 A1* | 5/2019 | Yamada | H04W 4/50 | |
| 2019/0207819 A1* | 7/2019 | Sathya | H04W 84/18 | |
| 2019/0215753 A1* | 7/2019 | Sathya | H04W 40/10 | |
| 2019/0253869 A1* | 8/2019 | Xu | H04W 40/246 | |
| 2019/0268773 A1* | 8/2019 | Myers | H04L 63/08 | |
| 2019/0273627 A1* | 9/2019 | Whalin | H04W 4/021 | |
| 2019/0274175 A1* | 9/2019 | Hassan | H04W 88/04 | |
| 2019/0312784 A1* | 10/2019 | Altay | H04L 41/122 | |
| 2019/0319705 A1* | 10/2019 | Harris | H04B 10/502 | |
| 2019/0334766 A1* | 10/2019 | Lee | H04L 49/25 | |
| 2019/0334772 A1* | 10/2019 | Huang | H04W 24/02 | |
| 2019/0349252 A1* | 11/2019 | Hu | H04L 41/0895 | |
| 2019/0379743 A1* | 12/2019 | Ives-Halperin | H04L 45/52 | |
| 2020/0029393 A1* | 1/2020 | Talbert | H04W 88/16 | |
| 2020/0092019 A1* | 3/2020 | Wang | H04W 4/33 | |
| 2020/0100164 A1* | 3/2020 | Osaki | H04W 24/08 | |
| 2020/0100168 A1* | 3/2020 | Kim | H04W 8/005 | |
| 2020/0221373 A1* | 7/2020 | Jeon | H04W 48/20 | |
| 2020/0228932 A1* | 7/2020 | Ernst | H04L 63/101 | |
| 2020/0229206 A1* | 7/2020 | Badic | H04W 28/0226 | |
| 2020/0244517 A1* | 7/2020 | Prasad | H04L 41/0668 | |
| 2020/0252107 A1* | 8/2020 | Jacobs | H04B 7/026 | |
| 2020/0322286 A1* | 10/2020 | Mehta | H04L 45/64 | |
| 2020/0322871 A1* | 10/2020 | Ernst | H04W 48/16 | |
| 2020/0323030 A1* | 10/2020 | Mehta | H04W 84/18 | |
| 2020/0359169 A1* | 11/2020 | Jiang | H04W 4/80 | |
| 2020/0396153 A1* | 12/2020 | Campora | H04L 45/04 | |
| 2020/0396613 A1* | 12/2020 | Duo | H04W 12/009 | |
| 2020/0413265 A1* | 12/2020 | Dabrowski | H04W 16/18 | |
| 2021/0026675 A1* | 1/2021 | Hadas | G06F 9/5077 | |
| 2021/0029614 A1* | 1/2021 | King | H04W 48/16 | |
| 2021/0042871 A1* | 2/2021 | Skonberg | G06Q 10/00 | |
| 2021/0099915 A1* | 4/2021 | Daniels | H04W 84/12 | |
| 2021/0105597 A1* | 4/2021 | Wright | H04W 4/60 | |
| 2021/0120555 A1* | 4/2021 | Badic | H04W 72/12 | |
| 2021/0152976 A1* | 5/2021 | Daoura | H04W 52/0254 | |
| 2021/0192574 A1* | 6/2021 | Walters | G06Q 20/325 | |
| 2021/0195373 A1* | 6/2021 | Geiger | H04W 4/023 | |
| 2021/0211325 A1* | 7/2021 | Singh | H04W 24/02 | |
| 2021/0211890 A1* | 7/2021 | VanBlon | H04W 8/005 | |
| 2021/0273851 A1* | 9/2021 | Knight | H04L 41/12 | |
| 2021/0282013 A1* | 9/2021 | Jiang | H04L 63/0869 | |
| 2021/0282223 A1* | 9/2021 | Pei | H04W 84/18 | |
| 2021/0297128 A1* | 9/2021 | Badic | G01S 5/0284 | |
| 2021/0306065 A1* | 9/2021 | Abedini | H04W 72/23 | |
| 2021/0314845 A1* | 10/2021 | Desai | H04W 40/248 | |
| 2021/0345100 A1* | 11/2021 | Smirnova | H04L 41/0806 | |
| 2021/0378038 A1* | 12/2021 | Foo | H04N 21/4518 | |
| 2021/0399949 A1* | 12/2021 | Hutz | H04L 45/28 | |
| 2022/0070672 A1* | 3/2022 | Zhang | H04L 43/0829 | |
| 2022/0081131 A1* | 3/2022 | Schwarz | B64G 1/1007 | |
| 2022/0095120 A1* | 3/2022 | Panje | H04B 17/318 | |
| 2022/0103456 A1* | 3/2022 | Cozza | H04W 40/22 | |
| 2022/0104102 A1* | 3/2022 | Amar | H04W 4/06 | |
| 2022/0110008 A1* | 4/2022 | Knouse | H04L 45/025 | |
| 2022/0110141 A1* | 4/2022 | Kwak | H04W 76/28 | |
| 2022/0159455 A1* | 5/2022 | Paczkowski | H04W 12/0431 | |
| 2022/0165146 A1* | 5/2022 | Daoura | H04W 8/005 | |
| 2022/0182130 A1* | 6/2022 | Abedini | H04B 7/15528 | |
| 2022/0225231 A1* | 7/2022 | Pei | H04W 76/27 | |
| 2022/0247654 A1* | 8/2022 | Springer | H04L 65/80 | |
| 2022/0256443 A1* | 8/2022 | Bleidorn-Piper | H04W 48/16 | |
| 2022/0261212 A1* | 8/2022 | Wilberding | G06F 3/167 | |
| 2022/0312262 A1* | 9/2022 | Chen | H04W 40/22 | |
| 2022/0337990 A1* | 10/2022 | Ebrahim Rezagah | H04W 76/14 |
| 2022/0394442 A1* | 12/2022 | Lebeau | H04W 4/60 | |
| 2023/0012327 A1* | 1/2023 | Wei | H04W 40/246 | |
| 2023/0013924 A1* | 1/2023 | Michielsen | H04L 47/32 | |
| 2023/0036645 A1* | 2/2023 | Qiao | H04L 12/4633 | |
| 2023/0053351 A1* | 2/2023 | Cheng | H04W 40/12 | |
| 2023/0067905 A1* | 3/2023 | Luo | H04W 72/0446 | |
| 2023/0074627 A1* | 3/2023 | Kwak | G06F 21/552 | |
| 2023/0097345 A1* | 3/2023 | Luther | H04W 40/32 | 370/310 |
| 2023/0122731 A1* | 4/2023 | Dutta | H04W 72/51 | 370/329 |
| 2023/0124255 A1* | 4/2023 | Ross | H01Q 9/045 | 370/310 |
| 2023/0143952 A1* | 5/2023 | Ergen | H04W 16/18 | 370/329 |
| 2023/0164089 A1* | 5/2023 | Greene | H04B 7/18521 | 709/226 |
| 2023/0164658 A1* | 5/2023 | Ishii | H04W 36/305 | 370/331 |
| 2023/0171309 A1* | 6/2023 | Bhatt | H04L 67/12 | 709/219 |
| 2023/0171826 A1* | 6/2023 | Selvanesan | H04W 76/14 | 370/310 |
| 2023/0180312 A1* | 6/2023 | Abedini | H04W 72/23 | 455/452.1 |
| 2023/0217294 A1* | 7/2023 | Hu | H04W 28/0231 | 370/329 |

(56) References Cited

U.S. PATENT DOCUMENTS

| | | | | |
|---|---|---|---|---|
| 2023/0232254 A1* | 7/2023 | Griffin | ............... | H04W 24/04 |
| | | | | 370/216 |
| 2023/0232282 A1* | 7/2023 | Belur Ramachandra | ................... | |
| | | | | H04W 28/16 |
| | | | | 370/252 |
| 2023/0239234 A1* | 7/2023 | Zohar | ............... | H04L 45/123 |
| | | | | 370/389 |
| 2023/0239943 A1* | 7/2023 | Paladugu | ............ | H04W 40/22 |
| | | | | 370/329 |
| 2023/0254284 A1* | 8/2023 | McCord | ............... | H04L 41/12 |
| | | | | 726/15 |
| 2023/0254323 A1* | 8/2023 | Maknickas | ........... | H04L 63/123 |
| | | | | 713/168 |
| 2023/0254324 A1* | 8/2023 | Maknickas | ........... | H04L 63/061 |
| | | | | 713/168 |
| 2023/0269166 A1* | 8/2023 | Griffin | ............... | H04W 40/24 |
| | | | | 709/238 |
| 2023/0344271 A1* | 10/2023 | Smith | .................... | G06F 21/44 |
| 2023/0362645 A1* | 11/2023 | Duo | ..................... | H04W 12/06 |
| 2024/0097920 A1* | 3/2024 | Robertson | ............ | H04L 9/0894 |

* cited by examiner

500

501
Receive input indicative of an instruction to utilize a consumer electronic device as a node in a mesh network 502
Cause transmission of a management platform to the consumer electronic device, so as to prompt installation on the consumer electronic device

601
Receive first input indicative of a request to utilize a consumer electronic device as a node in a mesh network 602
Identify nodes in the mesh network that are presently discoverable by, and accessible to, the consumer electronic device 603
Instruct a user to deploy the consumer electronic device in a location with inadequate coverage by the mesh network 604
Implement a routing scheme that indicates where data received by the consumer electronic device should be next routed depending on accessibility of the identified nodes

701
Receive first input indicative of a request to improve or extend a mesh network by adding a consumer electronic device as a node 702
Instruct a user to deploy the consumer electronic device in a location with inadequate coverage by the mesh network 703
Amplify a signal corresponding to the mesh network, so as to provide an additional access point to the mesh network for which coverage is either improved within its current area or extended into a larger area

FIGURE 7

REPURPOSING CONSUMER ELECTRONIC DEVICES AS NODES IN WIRELESS MESH NETWORKS

TECHNICAL FIELD

Various embodiments concern approaches to improving the coverage of local network topologies such as wireless mesh networks.

BACKGROUND

The terms "wireless mesh network," "mesh network," or simply "meshnet" are commonly used to refer to a local network topology in which infrastructure nodes are dynamically connected to one another via wireless communication channels. Normally, each infrastructure node is connected to as many other infrastructure nodes as possible, such that the infrastructure nodes in a mesh network can cooperate with one another to efficiently route data.

This lack of dependency on any single infrastructure node allows for different infrastructure nodes to participate in the relay of data from a source to a destination. Assume, for example, that a series of infrastructure nodes are deployed throughout an environment (e.g., a home) to establish the coverage of a mesh network. Accessibility of the mesh network may depend on the location of an electronic device seeking access. As an example, consider a scenario where a wall is positioned between the electronic device and a first infrastructure node, thereby preventing or inhibiting consistent access to the mesh network. In this scenario, access could be provided by a second infrastructure node that offers better connectivity than the first infrastructure node.

A mesh network may be designed to self-organize in a dynamic manner, so as to reduce the installation overhead of its infrastructure nodes. While the exact meaning of the term "infrastructure node" or simply "node" may vary across different configurations, these terms are generally used to refer to specialized electronic devices that are capable of creating, receiving, boosting, or transmitting signals indicative of data over a wireless communication channel. Examples of specialized electronic devices include routers and satellite devices that extend the wireless coverage of routers. In a mesh network, infrastructure nodes can serve as redistribution points through which data is routed or endpoints for which data is destined.

In addition to creating a strong, reliable signal, mesh networks offer several other noteworthy benefits. One feature that distinguishes mesh networks from conventional networks is the easy access they provide. The system underlying a mesh network—namely, the mesh-enabled router and satellite devices—may be completely automated, allowing for easy management. Moreover, the system may not require constant reconnection—even if the electronic device seeking access to the mesh network is moving around. With traditional routers, specialized electronic devices called "range extenders" are commonly used to repeat the signal so that the network can be accessed from longer distances. However, range extenders require that a separate network, with a separate name, be created. This means that as an electronic device moves, it may have to switch between different networks.

Mesh networks do suffer from drawbacks, however. Notably, infrastructure nodes tend to be expensive. Mesh-enabled routers can cost several hundred dollars, and each satellite device can cost several hundred dollars. In comparison, traditional routers can be purchased for less than one hundred dollars, while range extenders can be purchased for less than fifty dollars. Despite offering better coverage in many scenarios, the high costs of mesh networks can inhibit adoption.

BRIEF DESCRIPTION OF THE DRAWINGS

FIG. 5 includes a flow diagram of a process for facilitating the installation of a management platform on a consumer electronic device to be repurposed as a node in a mesh network.

FIG. 6 includes a flow diagram of a process for routing data similar to a satellite device.

FIG. 7 includes a flow diagram of a process for improving or extending coverage of a mesh network.

Figure 1:
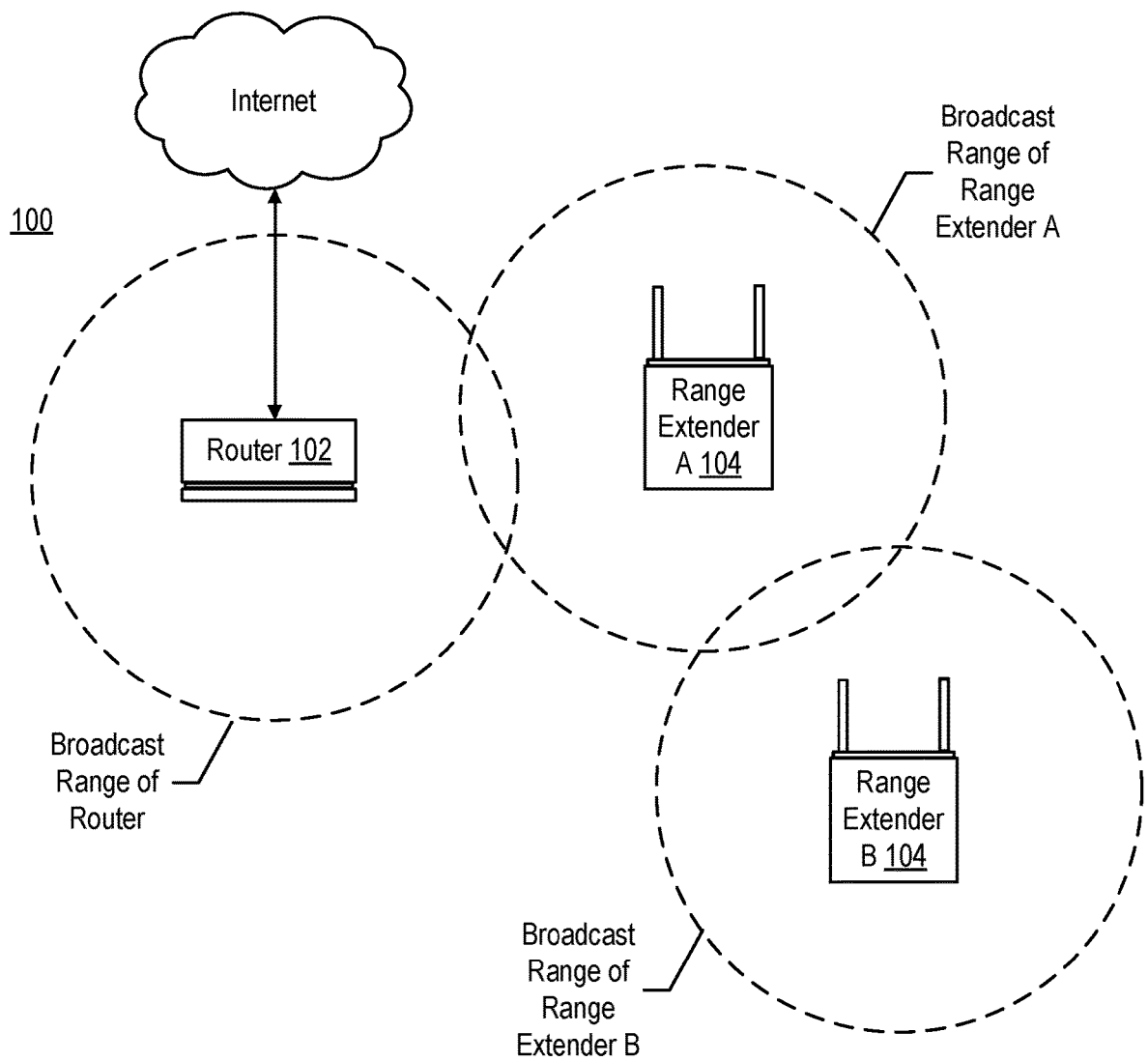
FIG. 1 includes a high-level illustration of a traditional wireless network.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

Mesh networks address many of the problems of traditional wireless networks. With a traditional wireless network, the router is the only link broadcasting the signal between the modem and nearby electronic devices. The further that an electronic device is from the router, the greater the likelihood that its connection to the traditional wireless network will be inconsistent.

Rather than rely on a single access point, a mesh system provides multiple access points, each of which corresponds to an infrastructure node (or simply "node"). Normally, one access point (called a "primary access point") is directly connected to the model that grants access to the Internet, while other access points (called "secondary access points") rebroadcast the signal emitted by the primary access point. Normally, a mesh-enabled router serves as the primary access point while satellite devices serve as the secondary access points. By amplifying the signal emitted by the primary access point, the secondary access points can expand coverage throughout a larger area, reaching spaces that would be "dead zones" in a traditional wireless network.

In comparison to traditional wireless networks, mesh networks are generally easier to use. Rather than struggle with an administrative interface generated by a traditional router or range extender, mesh networks can normally be controlled through a dedicated computer program. As an example, a user may install a mobile application on her mobile phone, and through the mobile application, the user may be able to review information regarding the mesh network. In comparison to traditional wireless networks, mesh systems are also relatively easy to deploy. Through the dedicated computer program, a user may be able to readily deploy new nodes that serve as new secondary access points.

Cost is an important consideration in deciding whether to deploy a mesh system. While the number of nodes included in a mesh system can vary based on various factors, including the size or shape of the area to be covered by the mesh network, costs generally average several hundred dollars per node. This can make deploying a new mesh network—or expanding an existing mesh network—an expensive proposition.

Introduced here, therefore, are approaches to improving the coverage of mesh networks that involve repurposing consumer electronic devices as nodes. By repurposing consumer electronic devices that are configured for a Wi-Fi wireless network protocol, the "dead spot" issue that plagues traditional wireless networks can be addressed at minimal cost. For the purpose of illustration, embodiments may be described in the context of consumer electronic devices, examples of which include mobile phones, tablet computers, wearable electronic devices, and the like. However, since consumer electronic devices tend to be readily portable, the term "consumer electronic device" may be used interchangeably with "portable electronic device."

Figure 2A:
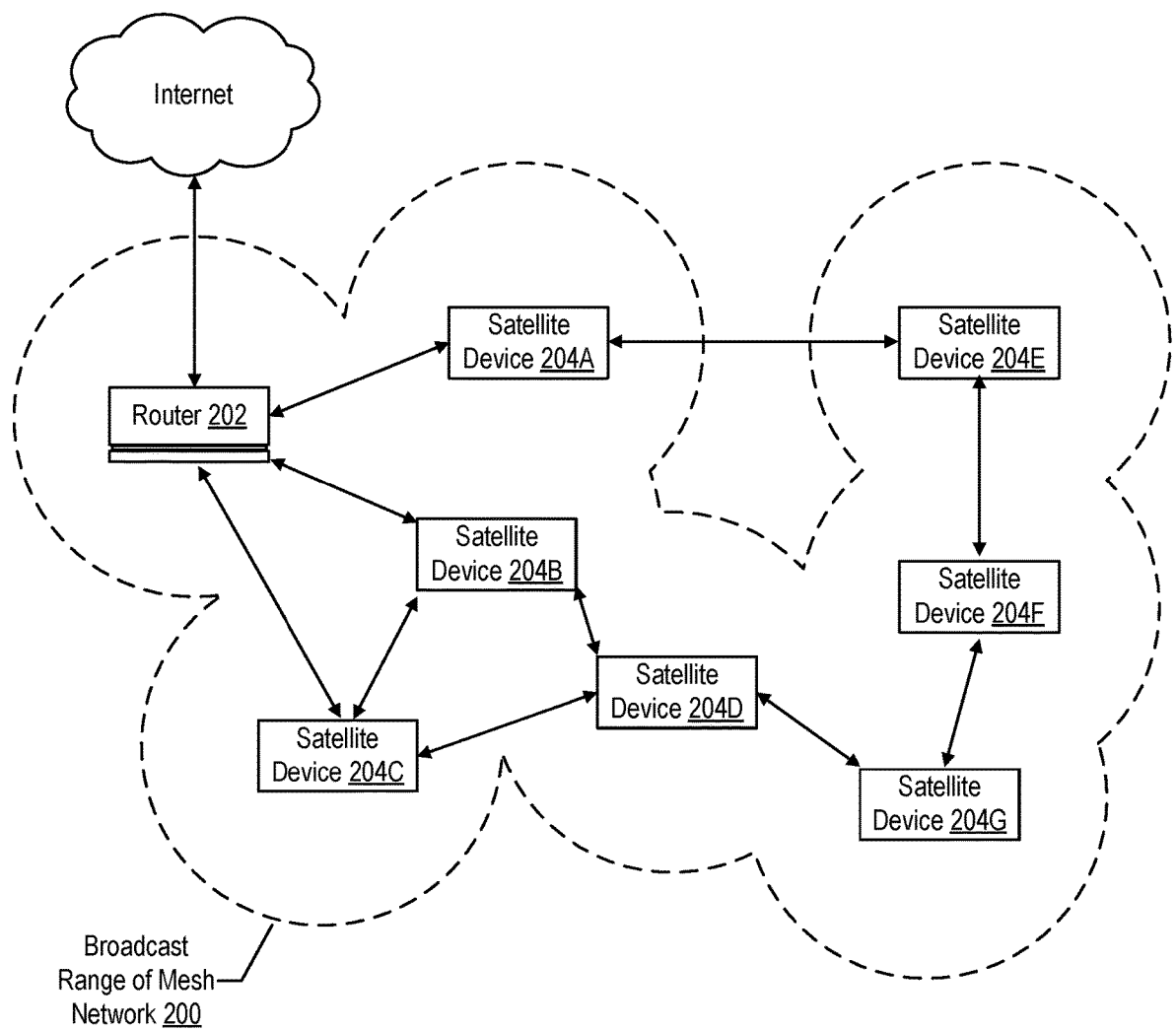
FIG. 2A includes a high-level illustration of a mesh network supported by a mesh system that includes (i) a router that is connected to the Internet (e.g., via a modem) and (ii) satellite devices that extend the coverage of the router.
Figure 2B:
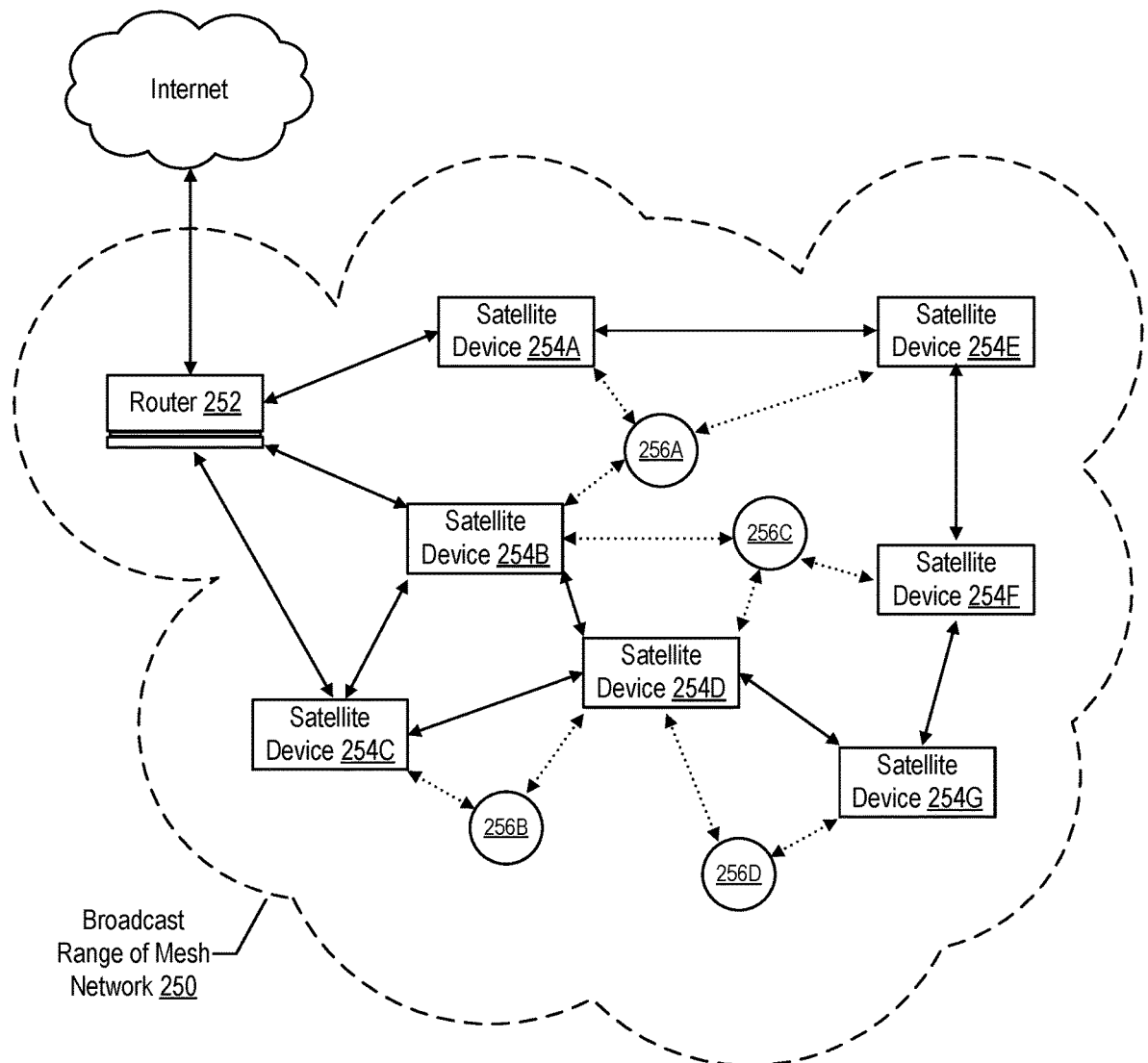
FIG. 2B includes a high-level illustration of a mesh network that includes consumer electronic devices that have been repurposed as nodes.

FIG. 1 includes a high-level illustration of a traditional wireless network 100. As explained above, "dead spots" may occur due to, among other things, limitations of the nodes (i.e., the traditional router 102 and range extenders 104) and characteristics of the environment in which the nodes are deployed. FIG. 2A includes a high-level illustration of a mesh network 200 supported by a mesh system that includes (i) a router 202 that is connected to the Internet (e.g., via a modem) and (ii) satellite devices 204A-G that extend the coverage of the router. FIG. 2B, meanwhile, includes a high-level illustration of a mesh network 250 that includes consumer electronic devices 256A-D that have been repurposed as nodes. These consumer electronic devices 256A-D can be used to "fill in gaps" in the coverage offered by the router 252 and satellite devices 254A-G. Accordingly, the consumer electronic devices could be located between satellite nodes to improve inter-node coverage. Additionally or alternatively, the consumer electronic devices could be located further from the router in order to extend coverage beyond the range offered by the satellite devices.

While the mesh system shown in FIG. 2B includes four consumer electronic devices, a mesh system could include any number of consumer electronic devices. For example, a user may temporarily repurpose a single consumer electronic device to improve coverage for an interval of time (e.g., while family is visiting). As further discussed below, a user may be permitted to repurpose consumer electronic devices as nodes at her convenience. These repurposed consumer electronic devices could be used in addition to, or instead of, satellite devices that are specially designed to improve coverage.

Nodes represent the fundamental units of a mesh network, as they are responsible for routing data through the mesh network. As mentioned above, mesh-enabled routers and satellite devices have traditionally served as the nodes of mesh networks. Regardless of its form, a node typically contains multiple radio systems and corresponding firmware that allows it to "talk" with nearby nodes. Consumer electronic devices are becoming more sophisticated, so much so that many consumer electronic devices include radio systems that are comparable, if not identical, to those radio systems traditionally included in satellite devices. Through the installation and execution of appropriate software, these consumer electronic devices can be instructed to operate similar to satellite devices (and therefore, function as nodes in mesh networks).

Embodiments may be described in the context of executable instructions for the purpose of illustration. However, those skilled in the art will recognize that aspects of the technology could be implemented via firmware or software. As an example, a computer program that is representative of a software-implemented management platform (or simply "management platform") may be executed by the processor of a consumer electronic device. The computer program may be developed or managed by a manufacturer of the router or satellite devices included in the mesh network of which the consumer electronic device is to become a part. Using the computer program, a user may be able to review information regarding a mesh network to which the consumer electronic device is connected. Additionally, the user may be able to repurpose the consumer electronic device as a node using the computer program.

Terminology

References in the present disclosure to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense. That is, in the sense of "including but not limited to." Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing all tasks.

When used in reference to a list of multiple items, the word "or" is intended to cover all of the following interpretations: any of the items in the list, all of the items in the list, and any combination of items in the list.

Overview of Management Platform

Figure 3:
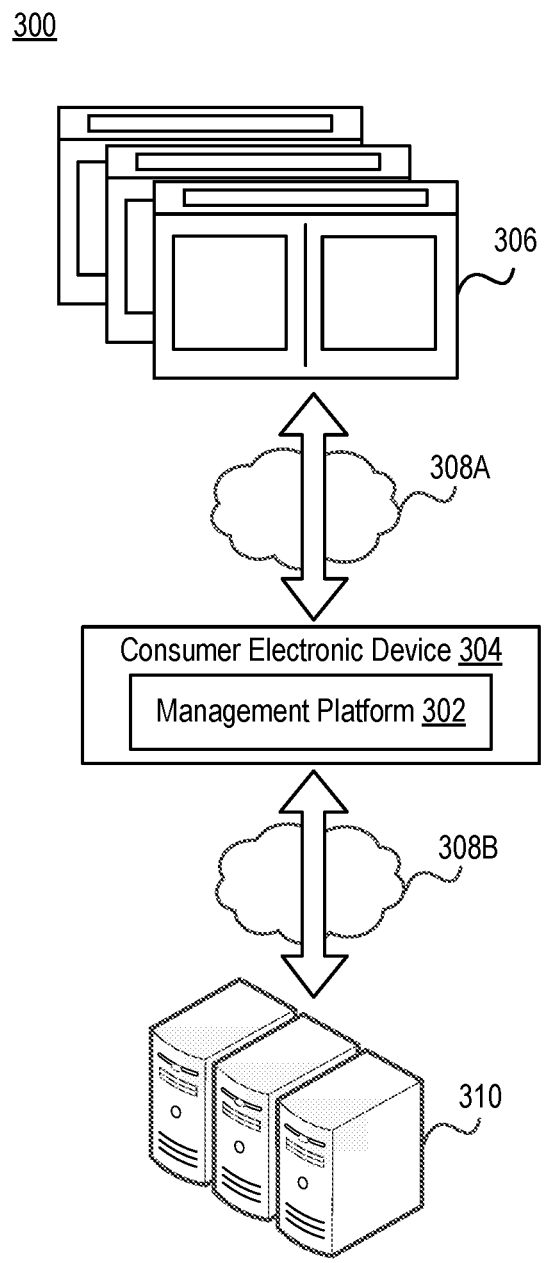
FIG. 3 illustrates a network environment that includes a management platform that is executed by a consumer electronic device.

FIG. 3 illustrates a network environment 300 that includes a management platform 302 that is executed by a consumer electronic device 304. An individual (also called a "user") may be able to interact with the management platform 302 via interfaces 306. For example, a user may be able to access an interface through which information regarding a mesh network to which the consumer electronic device 304 is connected can be reviewed. As another example, a user may be able to access an interface through which she can specify that the consumer electronic device 304 (or another consumer electronic device) is to be repurposed as a node in the mesh network.

As shown in FIG. 3, the management platform 302 may reside in a network environment 300. Thus, the consumer electronic device 304 on which the management platform 302 resides may be connected to one or more networks 308A-B. Through its deployment as a node, the consumer electronic device 304 may be connected to routers, satellite devices, or other consumer electronic devices via a local area network (LAN). Additionally, the consumer electronic device 304 could be connected to a personal area network (PAN), wide area network (WAN), metropolitan area network (MAN), or cellular network. For example, if the consumer electronic device 304 is a mobile phone, then the consumer electronic device 304 may be connected to a cellular network in addition to the LAN. Note, however, that user may prefer to deploy unused or underused consumer electronic devices as nodes in mesh networks, and therefore the mobile phone may only be connected to the LAN even though it may still be able to connect to the cellular network.

The interfaces 306 may be accessible via a web browser, desktop application, mobile application, or over-the-top (OTT) application. For example, to repurpose the consumer electronic device 304 as a node, a user may initiate installation of the management platform 302—in the form of a mobile application—on the consumer electronic device 304 and then complete a repurpose operation (also called a "repurpose procedure") through interfaces generated by the mobile application. As another example, a user may access, via a web browser, an interface generated by the management platform 302 through which she can specify that the consumer electronic device 304 is to be repurposed. This interface could include a list of consumer electronic devices that are presently using the mesh network or a list of all consumer electronic devices that have used the mesh network (e.g., over the last week, month, year, or ever), and the user may be able to simply select the consumer electronic device 304 from the list. Accordingly, the interfaces 306 may be accessible to the consumer electronic device 304 that is to be repurposed as a node, as well as other consumer electronic devices.

Generally, the management platform 302 is executed by a cloud computing service operated by, for example, Amazon Web Services®, Google Cloud Platform™, or Microsoft Azure®. Thus, the management platform 302 may reside on a server system 310 that is comprised of one or more computer servers. These computer servers can include different types of data (e.g., information regarding mesh networks and deployed nodes, such as serial numbers and connection status for routers, satellite devices, and repurposed consumer electronic devices), algorithms for processing, presenting, and obfuscating the data, and other assets. Those skilled in the art will recognize that this information could also be distributed among the server system 310 and consumer electronic devices. For example, sensitive information regarding a mesh network and its nodes may be stored on, and processed by, the consumer electronic device through which the mesh network is managed.

As mentioned above, aspects of the management platform 302 could be hosted locally, for example, in the form of a computer program executing on the consumer electronic device 304. Several different versions of computer programs may be available depending on the intended use. Assume, for example, that a user would like to manage a mesh network using a first consumer electronic device (e.g., tablet computer) and repurpose a second consumer electronic device (e.g., a mobile phone) as a node in the mesh network. While the computer programs installed on the first and second consumer electronic devices may share features in common, the computer programs need not be identical. For example, the computer program installed on the first consumer electronic device may be designed for seamless management of the mesh network. The computer program may allow the user to review information regarding the mesh network, identify "dead spots" in the mesh network, and indicate when new nodes have been added to the mesh network. Conversely, the computer program installed on the second consumer electronic device may be designed to emulate the functionality of a satellite device. When executed, the computer program may identify nodes in the mesh network that are presently accessible to the second consumer electronic device and then implement a routing scheme that indicates how data received by the second consumer electronic device is to be routed to those nodes depending on accessibility. Note that the computer program installed on the first consumer electronic device and/or the computer program installed on the second consumer electronic device may be connected to the server system 310 on which other aspects of the management platform 302 are hosted.

Figure 4:
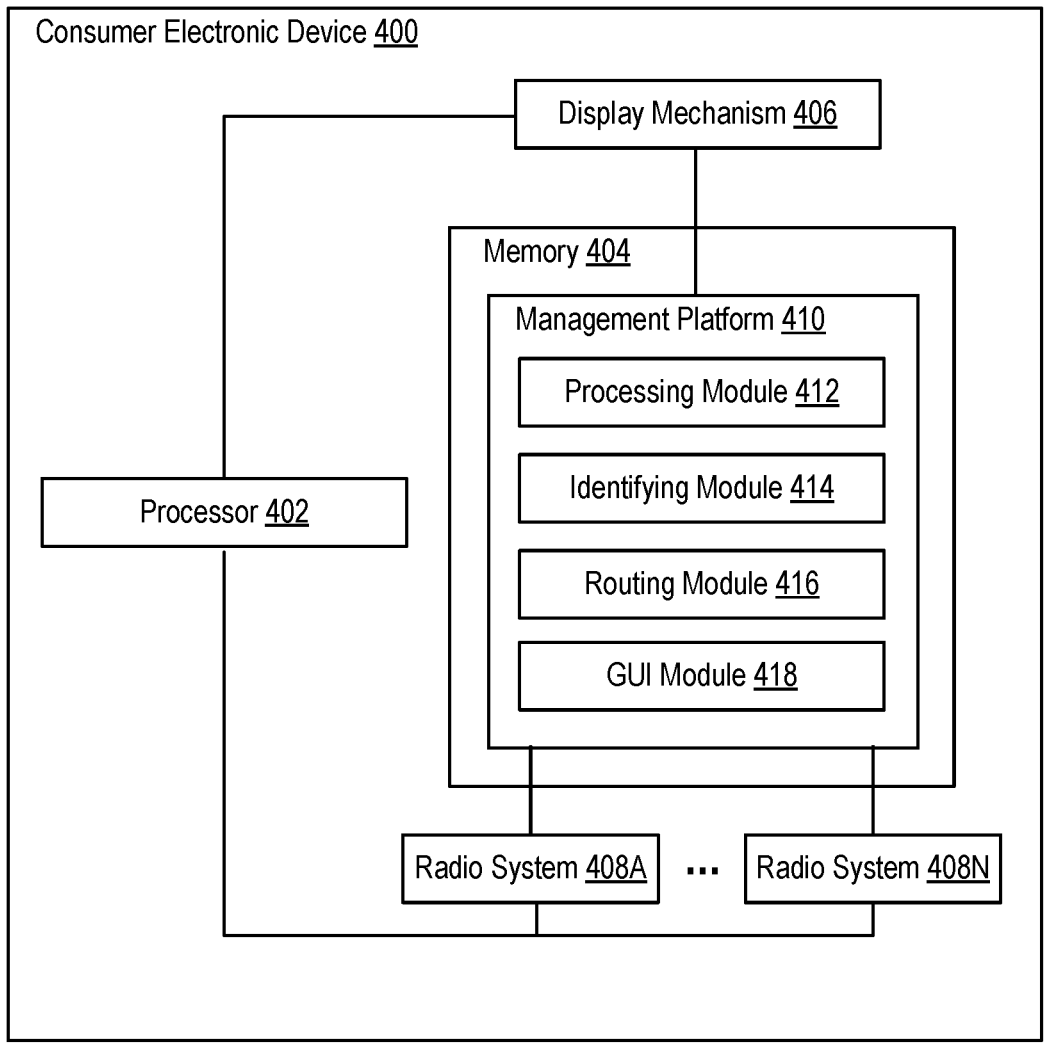
FIG. 4 illustrates an example of a consumer electronic device able to implement a management platform that, in operation, allows the consumer electronic device to function as a node in a mesh network.

FIG. 4 illustrates an example of a consumer electronic device 400 able to implement a management platform 410 that, in operation, allows the consumer electronic device 400 to function as a node in a mesh network. As shown in FIG. 4, the consumer electronic device 400 can include a processor 402, memory 404, display mechanism 406, and one or more radio systems 408A-N. Each of these components is discussed in greater detail below. Those skilled in the art will recognize that different combinations of these components may be present depending on the nature of the consumer electronic device 400.

The processor 402 can have generic characteristics similar to general-purpose processors, or the processor 402 may be an application-specific integrated circuit (ASIC) that provides control functions to the consumer electronic device 400. The processor 402 can be coupled to all components of the consumer electronic device 400, either directly or indirectly, for communication purposes.

The memory 404 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 402, the memory 404 can also store data generated by the processor 402 (e.g., when executing the modules of the management platform 410). Note that the memory 404 is merely an abstract representation of a storage environment. The memory 404 could be comprised of actual integrated circuits (also called "chips").

The display mechanism 406 can be any mechanism that is operable to visually convey information to a user. For example, the display mechanism 406 may be a panel that includes light-emitting diodes (LEDs), organic LEDs, liquid crystal elements, or electrophoretic elements. In some embodiments, the display mechanism 406 is touch sensitive. Thus, the user may be able to provide input to the management platform 410 by interacting with the display mechanism 406.

The radio systems 408A-N may be responsible for managing communications external to the consumer electronic device 400. When the consumer electronic device 400 is used for its intended purpose (e.g., as a mobile phone, tablet computer, etc.), the radio systems 408A-N may facilitate communication with other electronic devices in a different manner than when the consumer electronic device 400 is repurposed as a node. Each radio system 408A-N may be wireless communication circuitry that is able to establish wireless communication channels with other electronic devices. Examples of wireless communication circuitry include 2.4 gigahertz (GHz) and 5 GHz chipsets compatible with Institute of Electrical and Electronics Engineers (IEEE) 802.11—also referred to as "Wi-Fi chipsets." Moreover, the radio systems 408A-N may include chipsets configured for Bluetooth, Near Field Communication (NFC), and the like.

For convenience, the management platform 410 is referred to as a computer program that resides within the memory 404. However, the management platform 414 could be comprised of firmware in addition to, or instead of, software. In accordance with embodiments described herein, the management platform 410 may include a processing module 412, identifying module 414, routing module 416, and graphical user interface (GUI) module 418. Each of these modules can be an integral part of the management platform 410. Alternatively, these modules can be logically separate from the management platform 410 but operate "alongside" it. Together, these modules enable the consumer electronic device 400 to function as a node in a mesh network.

The processing module 412 can process data obtained by the management platform 410 into a format that is suitable for the other modules. Additionally or alternatively, the processing module 412 may gain insights that can be used by the other modules through analysis of the data. Assume, for example, that data received by the consumer electronic device 400 (e.g., by one of the radio systems 408A-N) is to be forwarded onward for transmittal to a destination via the Internet. In such a scenario, the processing module 412 may examine the data to determine the best route through the mesh network, whether "boosting" of the signal is necessary, etc.

The identifying module 414 may be responsible for identifying nodes that are presently detectable by the consumer electronic device 400. As mentioned above, nodes in mesh networks are generally self-configuring, meaning that the mesh system won't slow down if one route is congested or if one node stops working. In order to register congestion or unresponsiveness of nodes, the identifying module 414 may monitor signals received (e.g., by the radio systems 408A-N) from those nodes. Simply put, the identifying module 414 can establish how to interconnect the consumer electronic device 400 among the other nodes in the mesh network.

The routing module 416 may be responsible for implementing a routing scheme that indicates where data received by the consumer electronic device 400 should be next routed in the mesh network. Satellite devices that are designed specifically for mesh networks normally employ adaptive routing technology or dynamic routing technology to map routes through the mesh network. The routing module 416 can perform a similar function, namely, determine an appropriate route along which data received by the consumer electronic device 400 should travel. To accomplish this, the routing module 416 may determine, based on outputs produced by the identifying module 414, an appropriate node to which to forward the data. This node could be the primary access point—namely, the router—for transmittal to the Internet, or this node could be another secondary access point—for example, a satellite device or another consumer electronic device—for transmittal onward toward the primary access point.

The GUI module 418 may be responsible for generating interfaces that can be presented on the display mechanism 406. Various types of information can be presented on these interfaces. For example, information that is calculated, derived, or otherwise obtained by the processing module 412 and/or identifying module 414 may be presented on an interface for display to the user. As another example, visual feedback may be presented on an interface so as to indicate to the user whether the repurpose procedure is being completed properly. For instance, information regarding the signal strengths of nodes that are presently detectable by, and accessible to, the consumer electronic device 400, so as to indicate where coverage inadequate (and therefore, placement of the consumer electronic device 400 may be appropriate).

Other implementations are also possible. These implementations include the following:

"Easy Mesh" Mechanism: Each node in a mesh network that does correspond to the mesh-enabled router can use a controller—implemented in hardware, firmware, or software—for management purposes. These controllers may be designed or programmed to connect to repurposed consumer electronic devices that act as "agents." Establishing controllers to manage and coordinate activity among the "agents" can ensure that (i) satellite devices do not interfere with one another and (ii) satellite devices do not interfere with repurposed consumer electronic devices. This may be helpful in ensuring expanded, uniform coverage and more efficient service across the mesh network.

"802.11" Mechanism: Nodes in a mesh network that do not correspond to the mesh-enabled router can form "mesh links" with one another, and each node can form an ad hoc subnetwork with a "repurposed" satellite device. Within the ad hoc subnetwork, "mesh paths" can be established using an ad hoc mobile routing protocol. A key aspect of this mechanism is the presence of multi-hop wireless links and routing of data (e.g., in the form of packets) through other nodes toward the destination.

Methodologies for Repurposing Consumer Electronic Devices as Nodes

FIG. 5 includes a flow diagram of a process 500 for facilitating the installation of a management platform on a consumer electronic device to be repurposed as a node in a mesh network. For the purpose of illustration, the process 500 is described as being performed by a server system (e.g., server system 310 of FIG. 3). However, the process 500 could be performed by any electronic device to which the consumer electronic device is presently accessible.

Initially, the server system can receive input indicative of an instruction to utilize a consumer electronic device as a node in a mesh network (step 501). In some embodiments, this input is received from the consumer electronic device. For example, a user may indicate (e.g., through her interactions with a digital distribution platform) that she wishes to download the management platform onto the consumer electronic device, thereby indicating an interest in repurposing the consumer electronic device. In other embodiments, this input is received from another electronic device. For example, a user may access an interface generated by the server system on her tablet computer and then indicate that she would like to repurpose her mobile phone as a node. The user could accomplish this by selecting the mobile phone from a list of consumer electronic devices presented on the interface. Accordingly, the input may originate on another consumer electronic device through which the user is able to manage the mesh network. If this other consumer electronic device is presently on the mesh network, then the input may be received from the node corresponding to the mesh-enabled router that acts as the primary access point.

Then, the server system can cause transmission of the management platform to the consumer electronic device, so as to prompt installation on the consumer electronic device (step 502). Said another way, the server system can initiate a download of the management platform to the consumer electronic device. As further discussed below, upon being installed on the consumer electronic device, the management platform may be configured to fully- or semi-autonomously implement the functions described above. Accordingly, the management platform may (i) identify nodes in the mesh network that are presently accessible to the consumer electronic device and then (ii) implement a routing scheme that indicates where data received by the consumer electronic device should be next routed. That is, the routing scheme may indicate how data received by the consumer electronic device should be routed among the identified nodes depending on accessibility.

In embodiments where the initial instruction is not received from the consumer electronic device, the user may be prompted—before, during, or after the management platform is downloaded—to confirm that the consumer electronic device is to be repurposed. Accordingly, the server system may receive, from the consumer electronic device, second input indicative of an acknowledgement that the management platform is to be installed on the consumer electronic device. Installation or execution of the management platform may be prevented until the second input is provided via the consumer electronic device.

The server system may remotely monitor the mesh network in some embodiments. This may be helpful in predicting or identifying instances of congestion, determining appropriate locations for deployment of nodes, etc. Accordingly, the server system may receive a signal that indicates whether the consumer electronic device is properly functioning as a node as intended. This signal can be generated by the management platform based on analysis of its operations. For example, this signal may be generated by the management platform based on outputs produced by its processing module (e.g., processing module 412 of FIG. 4), identifying module (e.g., identifying module 414 of FIG. 4), or routing module (e.g., routing module 416 of FIG. 4). The management platform may be programmed to generate this signal on a periodic basis (e.g., every 10, 30, or 60 minutes), or the management platform may be programmed to generate this signal on an ad hoc basis (e.g., upon discovering the consumer electronic device is not operating as intended). Upon receiving this signal, the server system can indicate in a data structure whether the consumer electronic device is functioning as part of the mesh network. The data structure may be representative of a digital profile that is maintained by the server system for the mesh network.

FIG. 6 includes a flow diagram of a process 600 for routing data similar to a satellite device. Initially, a management platform executing on a consumer electronic device may receive first input indicative of a request to utilize the consumer electronic device as a node in a mesh network (step 601). The first input normally corresponds to a user either initiating (i.e., downloading or opening) the management platform or interacting with the management platform in such a manner so as to indicate that she is interested in repurposing the consumer electronic device. For example, the user may interact with a digital element labeled "Repurpose Device" or "Deploy as Node" that is viewable on an interface generated by the management platform.

In some embodiments, the management platform infers the mesh network of which the consumer electronic device is to become a part based on its current connection to the mesh network. Normally, the manner in which consumer electronic devices are connected to mesh networks (and traditional wireless networks) is governed by their operating systems. In a mobile phone, for example, a user may simply select the mesh network in the settings menu. In other embodiments, the management platform requires that the user specify the mesh network of which the consumer electronic device is to become a part. For example, the management platform may cause display of an interface through which the user is able to select the mesh network (e.g., from among all mesh networks that are presently accessible to the consumer electronic device).

The management platform can then identify nodes in the mesh network that are presently discoverable by, and accessible to, the consumer electronic device (step 602). In order to function as a node, at least one other node may need to be accessible to the consumer electronic device. However, any number of other nodes may be accessible to the consumer electronic device at a given point in time. In some embodiments, the management platform is configured to instruct the user to deploy the consumer electronic device in a location with inadequate coverage by the mesh network (step 603). Areas with inadequate coverage may be identified based on the number of nodes that can be identified in those areas and the signal strength of those nodes. For example, the management platform may display information regarding the signal strengths of nodes that are presently accessible to the consumer electronic device. As the consumer electronic moves, the information can be updated so as to indicate where coverage is inadequate.

Thereafter, the management platform can implement a routing scheme that indicates where data received by the consumer electronic device should be next routed depending on accessibility of the identified nodes (step 604). Generally, the routing scheme is adaptive, dynamic, or otherwise manipulable so that changes in the mesh network can be accounted for. Consider, for example, a scenario where a first node to which the consumer electronic device is connected becomes unavailable (e.g., loses power, experiences congestion, etc.). In this scenario, the management platform should adapt the routing scheme so that data is instead routed to a second node for transmittal through the mesh network. The routing scheme may be based on the nodes that are presently accessible to the consumer electronic device. As such, steps 602 and 603 may be iteratively performed in a continual manner, so that the routing scheme is updated—as necessary—to account for changes in the mesh network.

FIG. 7 includes a flow diagram of a process 700 for improving or extending coverage of a mesh network. Initially, a management platform may receive input indicative of a request to improve or extend a mesh network by adding a consumer electronic device as a node (step 701). Step 701 of FIG. 7 may be comparable to step 601 of FIG. 6. Thereafter, the management platform may instruct a user to deploy the consumer electronic device in a location with inadequate coverage by the mesh network (step 702). For example, the management platform may instruct the user to deploy the consumer electronic device in a "dead spot" that is not sufficiently covered by the mesh network to provide adequate coverage. As explained above, the user may be aided through the display of information regarding the signal strengths of other nodes in the mesh network.

In response to a determination that the consumer electronic device is properly deployed, the management platform can begin acting as a node in the mesh network. For example, the management platform may amplify a signal corresponding to the mesh network, so as to provide an additional access point to the mesh network for which coverage is either improved within its current area or extended into a larger area (step 703). The management platform may accomplish this using a signal booster circuit (also called a "signal amplifier circuit") housed in the consumer electronic device. At a high level, a signal amplifier circuit is able to increase the magnitude of the signal applied to its input terminal. The management platform may determine that the consumer electronic device has been properly deployed based on input, provided by the user, that is indicative of an acknowledgement the consumer electronic device is located in its intended position. Note that, when deployed, the consumer electronic device could be connected to some or all of the nodes in the mesh network, depending on its location. For example, the consumer electronic device may be directly connected to a mesh-enabled router that provides access to the Internet. As another example, the consumer electronic device may be indirectly connected to the mesh-enabled routed via one or more satellite devices and/or one or more other consumer electronic devices operating as nodes.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Processing System

Figure 8:
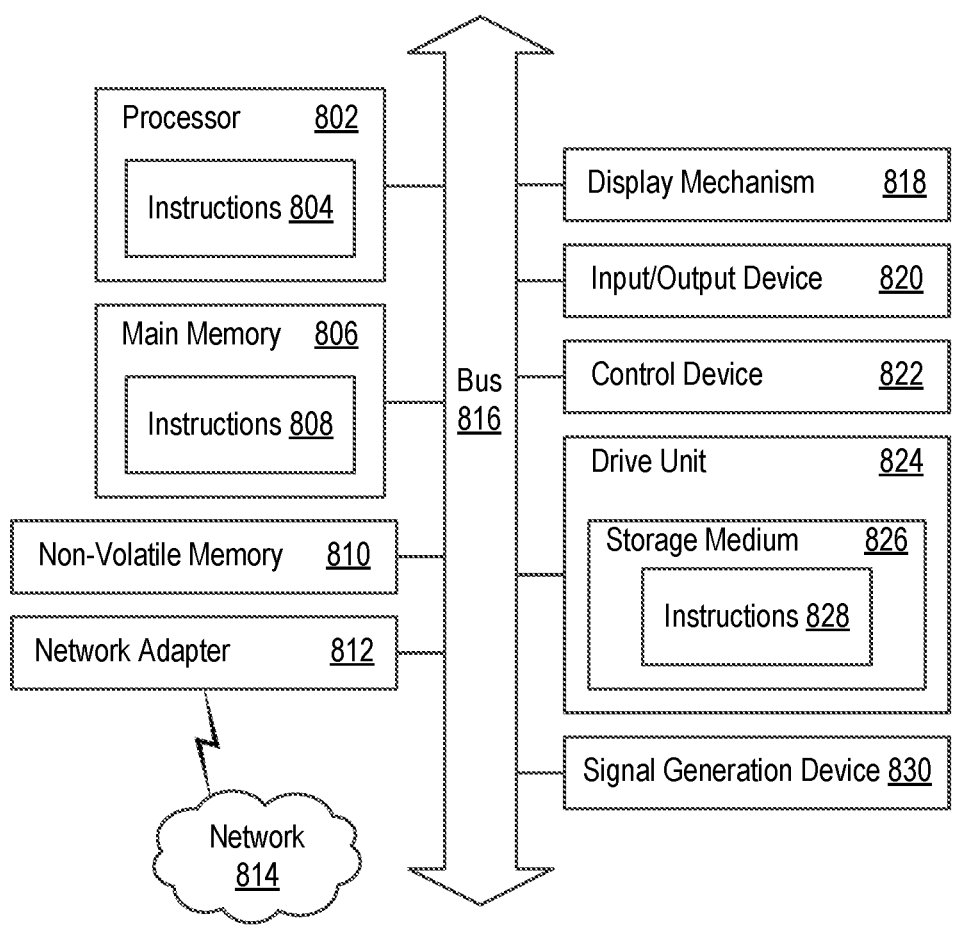
FIG. 8 is a block diagram illustrating an example of a processing system in which at least some operations described herein can be implemented.

FIG. 8 is a block diagram illustrating an example of a processing system 800 in which at least some operations described herein can be implemented. For example, components of the processing system 800 may be hosted on a consumer electronic device to be repurposed as a node in a mesh network.

The processing system 800 may include a processor 802, main memory 806, non-volatile memory 810, network adapter 812, display mechanism 818, input/output devices 820, control device 822 (e.g., a keyboard or pointing device), drive unit 824 including a storage medium 826, and signal generation device 830 that are communicatively connected to a bus 816. The bus 816 is illustrated as an abstraction that represents one or more physical buses or point-to-point connections that are connected by appropriate bridges, adapters, or controllers. The bus 816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an IEEE Standard 1394 bus (also referred to as "Firewire").

While the main memory 806, non-volatile memory 810, and storage medium 826 are shown to be a single medium, the terms "machine-readable medium" and "storage medium" should be taken to include a single medium or multiple media (e.g., a centralized/distributed database and/or associated caches and servers) that store one or more sets of instructions 928. The terms "machine-readable medium" and "storage medium" shall also be taken to include any medium that is capable of storing, encoding, or carrying a set of instructions for execution by the processing system 800.

In general, the routines executed to implement the embodiments of the disclosure may be implemented as part of an operating system or a computer programs. Computer programs typically comprise instructions (e.g., instructions 804, 808, 828) set at various times in various memory and storage devices in an electronic device. When read and executed by the processor 802, the instructions cause the processing system 800 to implement aspects of the present disclosure.

Further examples of machine- and computer-readable media include recordable-type media, such as volatile memory devices and non-volatile memory devices 810, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 812 enables the processing system 800 to mediate data in a network 814 with an entity that is external to the processing system 800 through any communication protocol supported by the processing system 800 and the external entity. The network adapter 812 can include a network adaptor card, a wireless network interface card, a router, an access point, a wireless router, a switch, a multi-layer switch, a protocol converter, a gateway, a bridge, bridge router, a hub, a digital media receiver, a repeater, or any combination thereof.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a server system, the method comprising:
receiving input indicative of an instruction to utilize a consumer electronic device as anode in a wireless mesh network that includes (i) a router that is connected to the Internet and (ii) one or more satellite devices that extend coverage of the router; and
causing transmission of a computer program to the consumer electronic device, wherein when executed by the consumer electronic device, the computer program
(i) identifies nodes in the wireless mesh network that is presently accessible to the consumer electronic device,
wherein each of the nodes is representative of either the router or one of the one or more satellite devices, and
(ii) causes the consumer electronic device to function as a node in the wireless mesh network by implementing a routing scheme that indicates which of the identified nodes data received by the consumer electronic device should be routed depending on accessibility, such that the consumer electronic device mimics an adaptive routing technology or a dynamic routing technology that is employed by the one or more satellite devices of the wireless mesh network.

2. The method of claim 1, wherein the input is received from the consumer electronic device.

3. The method of claim 1, wherein the input originates on another consumer electronic device that is presently connected to the wireless mesh network.

4. The method of claim 3, further comprising:
receiving, from the consumer electronic device, second input indicative of an acknowledgement that the computer program is to be installed on the consumer electronic device, wherein execution of the computer program by the consumer electronic device is prevented until the second input is provided via the consumer electronic device.

5. The method of claim 3, wherein the input is received from a given node that corresponds to the router based on its connection to a modem that accesses the Internet.

6. The method of claim 1, further comprising:
receiving a signal that indicates the consumer electronic device is functioning as a node in the wireless mesh network as intended, wherein the signal is generated by the computer program based on its routing of data in the wireless mesh network.

7. The method of claim 6, further comprising:
in response to receiving the signal, indicating in a data structure that the consumer electronic device is part of the wireless mesh network.

8. The method of claim 7, wherein the data structure is representative of a digital profile maintained by the server system for the wireless mesh network.

9. A non-transitory medium with instructions stored thereon that, when executed by a processor of a consumer electronic device, cause the consumer electronic device to perform operations comprising:
receiving input indicative of a request to expand a wireless mesh network by adding the consumer electronic device as a node,
wherein the wireless mesh network includes (i) a router that is connected to the Internet
and (ii) one or more satellite devices that extend coverage of the router;
instructing a user to deploy the consumer electronic device in a location with inadequate coverage by the wireless mesh network;
causing the consumer electronic device to function as a node in the wireless mesh network by amplifying a signal corresponding to the wireless mesh network, so as to provide an additional access point for the wireless mesh network for which coverage is expanded throughout a larger area; and
determining, based on an analysis of operations of the consumer electronic device while operating as the node in the wireless mesh network, whether the location is appropriate.

10. The non-transitory medium of claim 9, wherein the input is indicative of a selection of the wireless mesh network through an interface generated by a computer program executing on the consumer electronic device.

11. The non-transitory medium of claim 9, wherein the consumer electronic device is directly connected to the router that provides access to the Internet.

12. The non-transitory medium of claim 9, wherein the consumer electronic device is indirectly connected to the router that provides access to the Internet via at least one of the one or more satellite devices.

* * * * *